(12) United States Patent
Fata

(10) Patent No.: US 12,047,036 B1
(45) Date of Patent: Jul. 23, 2024

(54) PRISM APPARATUS FOR AN ELECTRIC CHARGING DEVICE

(71) Applicant: Henry Kamahoahoa Fata, Las Vegas, NV (US)

(72) Inventor: Henry Kamahoahoa Fata, Las Vegas, NV (US)

(*) Notice: Subject to any disclaimer, the term of this patent is extended or adjusted under 35 U.S.C. 154(b) by 17 days.

(21) Appl. No.: 18/095,346

(22) Filed: Jan. 10, 2023

Related U.S. Application Data

(63) Continuation-in-part of application No. 17/233,484, filed on Apr. 17, 2021, now Pat. No. 11,581,847.

(60) Provisional application No. 63/011,346, filed on Apr. 17, 2020.

(51) Int. Cl.
*H02S 40/22* (2014.01)
*H02J 50/27* (2016.01)
*H02J 50/30* (2016.01)
*H02J 50/40* (2016.01)
*B60L 53/10* (2019.01)

(52) U.S. Cl.
CPC .............. *H02S 40/22* (2014.12); *H02J 50/27* (2016.02); *H02J 50/30* (2016.02); *H02J 50/402* (2020.01); *B60L 53/10* (2019.02)

(58) Field of Classification Search
CPC ....................................................... H02S 40/22
See application file for complete search history.

(56) References Cited

U.S. PATENT DOCUMENTS

2012/0291849 A1   11/2012  Fata

FOREIGN PATENT DOCUMENTS

WO   WO-2005078356 A1 *  8/2005   .............. F24C 15/22

* cited by examiner

*Primary Examiner* — Adi Amrany
(74) *Attorney, Agent, or Firm* — Lewis Roca Rothgerber Christie LLP

(57) ABSTRACT

A portable electrical charging apparatus comprises a lens apparatus capable of receiving light energy. A primary light energy communication apparatus has a first end and a second end. That first end is in light communication with the lens apparatus. An enclosure member has a cavity that is in light communication with the second end. A prism is disposed in the enclosure member's cavity. The prism refracts the light energy in the cavity in the enclosure member. A secondary light energy communication apparatus has a first end and a second end. Its first end is in light communication with the enclosure member's cavity. Its second end is in light communication with the interior of a box. A photovoltaic device is positioned in the interior of the box and is capable of receiving light energy and converting it to electrical energy. Light energy from the lens apparatus is communicated through the primary light energy communication apparatus, the cavity in the enclosure member, the prism, and through the secondary light energy communication apparatus, to the photovoltaic device.

20 Claims, 9 Drawing Sheets

PRISM APPARATUS FOR AN ELECTRIC CHARGING DEVICE

CROSS-REFERENCE TO RELATED APPLICATION

This patent application is a continuation of U.S. application Ser. No. 17/233,484 entitled PHOTOVOLTAIC AND ELECTROMAGNETIC POWERED MOBILE ELECTRIC VEHICLE CHARGING STATION, which was filed on Apr. 17, 2021, and which was based on provisional patent application No. 63/011,346 filed on Apr. 17, 2020. The contents thereof are incorporated herein by reference.

FIELD OF INVENTION

This invention concerns electrical charging and, more specifically, apparatus for converting light energy to electric energy.

BACKGROUND

Electric vehicles have gained in popularity in recent years. Consumers are attracted to them because they are environmentally friendly as they do not require the combustion of fossil fuels. With the looming threat of global warming, consumers tend to favor such environmentally friendly options.

Electric vehicles have achieved significant advancements in recent years. Arguably, the most notable advancements pertain to the batteries that store and provide electric power for the vehicle's operation. Because there is no engine in an electric vehicle, the sole source of power for the entire vehicle is the electric battery. Accordingly, the battery, including its capacity to store electric power, is of critical importance for the vehicle's overall performance and reliability.

Despite the considerable advancements in the quality and performance of electric vehicle batteries, their performance limitations remain a hinderance for consumers. An electric vehicle battery's electricity-storage capacity continues to be fairly limited despite the noteworthy advancements in their technology. At best, an electric vehicle's battery delivers enough power only for a few hundred miles of travel. Beyond that, the battery must be recharged for the vehicle to continue to operate.

Electric vehicles sometimes need to travel farther distances than just a few hundred miles before having an opportunity to recharge the battery. Because of that reason, the battery may sometimes run out of power because of a consumer's inadvertent mistake in knowing the amount of charge in their vehicle's battery versus the distance they need to travel before having an opportunity to recharge it. This sometimes results in the battery running out of power and the vehicle being stranded. In such event, the battery must be recharged to render it operational again. It would require at least enough of a recharge to enable the vehicle to be driven to a recharging station where the battery may be recharged more.

Accordingly, there is a need for an apparatus and a method to help charge a battery, such as an electric vehicle's battery, preferably at a location where the respective battery may need a recharge.

COPYRIGHT NOTICE

©2022 Henry Kamahoahoa Fata'aiki. The disclosure in this patent document includes material that is subject to copyright protection. The copyright owner consents to fair use by facsimile reproduction of the patent document or of the patent disclosure as it appears in the U.S. Patent and Trademark Office's records. All other copyright rights to this disclosure are expressly reserved. 37 CFR § 1.71(d).

SUMMARY

An electrical charging apparatus comprises a lens apparatus capable of receiving light energy. A primary light energy communication apparatus has a first end and a second end, the first end of the primary light energy communication apparatus is in light communication with said lens apparatus. An enclosure member has a cavity, which is in light communication with the second end of the primary light energy communication apparatus.

A prism is disposed in the cavity in the enclosure member. A secondary light energy communication apparatus has a first end and a second end. The first end of the secondary light energy communication apparatus is in light communication with the cavity in the enclosure member.

A box has an interior. The second end of the secondary light energy communication apparatus is in light communication with the interior of the box. A photovoltaic device is positioned in the interior of the box. The photovoltaic device is capable of receiving light energy and converting it to electrical energy. The interior of said box has a reflective surface or a reflective coating.

Light energy from the lens apparatus is communicated through the primary light energy communication apparatus, through the cavity in the enclosure member, through the prism, and through the secondary light energy communication apparatus, to the photovoltaic device. The prism refracts the light energy in the cavity in the enclosure member.

In alternate embodiments, a plurality of photovoltaic devices may be positioned in the interior of the box. The plurality of photovoltaic devices are capable of receiving light energy and converting it to electrical energy. The primary light energy communication apparatus and the secondary light energy communication apparatus may be fiberoptic cables.

A power storage device is in electrical communication with said photovoltaic device. The power storage device may comprises a lithium-ion battery, a lithium-iron phosphate battery, a kinetic energy battery, a nickel-cadmium battery, a nickel-metal hydride battery, or a lead-acid battery.

The lens apparatus comprises a photovoltaic collector for receiving light energy. The photovoltaic collector comprises a conical shape with an opening at a first end and a focal point at a second end. A lens is implemented at the first end of the conical shape. The first end of the primary light energy communication apparatus is in light communication with the focal point at the second end of the conical shape. The lens may be a Fresnel lens.

The conical shape of the photovoltaic collector has an interior. The interior of the conical shape of the photovoltaic collector is reflective or is coated with a reflective material.

The lens apparatus may comprise a plurality of photovoltaic collectors for receiving light energy. A heat sink is associated with the photovoltaic device to dissipate heat from the photovoltaic device.

A plurality of secondary light energy communication apparatuses each comprise a first end and a second end. Their first end is in light communication with the cavity in the enclosure member. Their second end is in light communication with the interior of the box. The plurality of secondary light energy communication apparatuses may be fiberoptic cables.

The second end of each of the plurality of secondary light energy communication apparatuses is preferably in light communication with the interior of the box at a different location in the interior of the box. Further, the first end of each of the plurality of secondary light energy communication apparatuses is preferably in light communication with the cavity in the enclosure member at a different location in the cavity.

The enclosure member may be cylindrical in shape. The first end of each of the plurality of secondary light energy communication apparatuses is preferably spaced equally apart from each other in the cavity in the enclosure member. The interior of the box has a plurality of sides, and each of the second ends of the plurality of secondary light energy communication apparatuses is in light communication with a different side of the interior of the box.

A rectenna and a charging port are provided in electrical communication with the power storage device.

DRAWINGS

The present invention can be better understood with reference to the figures. In these figures, like reference numerals designate corresponding parts throughout the different figures and views.

DETAILED DESCRIPTION

The systems, methods, and apparatus of the present invention are described below with reference to the figures. The description and figures are for illustrative purposes only, they do not limit the true spirit and scope of the present invention. The true spirit and scope of the present invention is evidenced by all parts of this disclosure, including the Summary, the Figures, the Detailed Description, the Claims, and the like, along with equivalents thereof.

Figure 1:
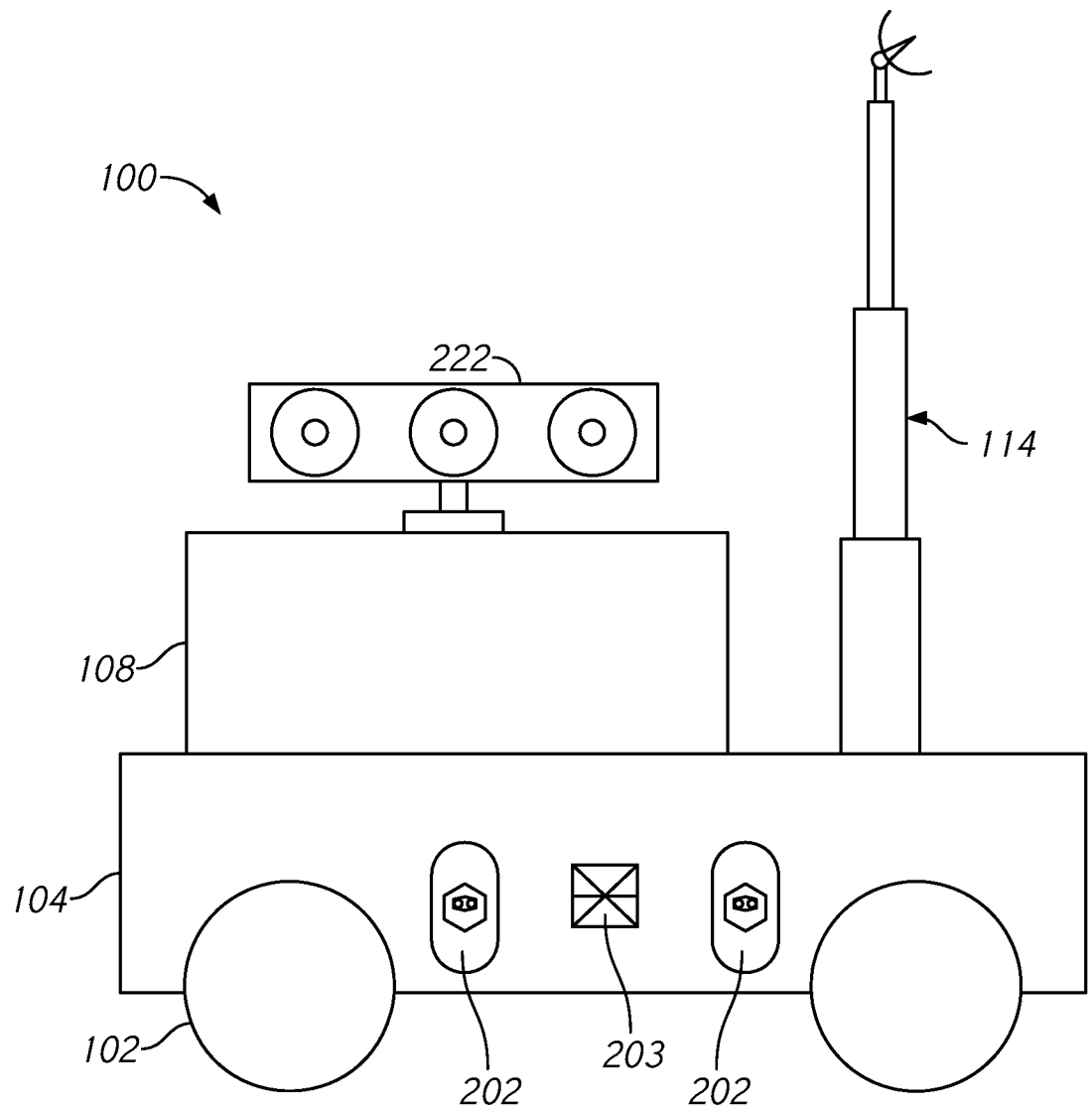
FIG. 1 shows a mobile apparatus according to one embodiment of the present invention.

One embodiment of the present invention is shown in FIG. 1. It comprises a mobile apparatus 100 that has a travel mechanism 102. In the embodiment shown, travel mechanism 102 comprises wheels rotatably attached to the mobile apparatus 100. However, it is anticipated that any other apparatus that allows the mobile apparatus 100 to be transportable may also serve as travel mechanism 102. For example, in alternative embodiments the travel mechanism 102 may comprise skis for the mobile apparatus's 100 portability in snowy conditions or on water, or the mobile apparatus 100 may be placed on the bed of a truck or a trailer, or on a boat, which would serve as a travel mechanism to transport the mobile apparatus 100. Accordingly, any apparatus that would allow the mobile apparatus 100 to be portable, or to be transported, from one location to another may serve as travel mechanism 102 for the mobile apparatus 100. All such embodiments are anticipated and are intended to be covered by the claims.

It is further anticipated that the mobile apparatus 100 in alternate embodiments may be self-propelled, such as by a driver or by an autonomous driving system. Autonomous self-driving technology is known in the art, such as electric vehicles sold under the trademark TESLA that include an autonomous driving feature whereby software designed to navigate and operate a vehicle is guided by geo-location software and cameras, that autonomously drive the vehicle from one location to another. In such embodiment, those skilled in the art will recognize that the navigation and/or operation of mobile apparatus 100 may be performed autonomously by software, and separate manual operation by a human will not be necessary. In an alternate embodiment, a driver may be capable of manually operating the mobile apparatus 100 and drive it from one location to another. Also, it is anticipated that the electric power source included in the mobile apparatus 100, such as an electric power storage system comprising a battery, may also be used to supply power for facilitating the transportation and mobility of mobile apparatus 100.

Mobile apparatus 100 has a platform 104. It is anticipated that the shape and dimensions of the platform 104 will typically vary for each embodiment. The particular size and shape of platform 104 will depend on the particular needs of the respective embodiment, such as the physical dimensions of the electric power storage system that is required for, or is implemented in, that embodiment. In the embodiment shown in FIG. 1, the platform 104 is shaped as a rectangular box. In alternate embodiments, the platform 104 may be shaped as a square box, rounded in the form of a dome, have an oval shape, or the like. All such variations and embodiments for platform 104 are consistent with the spirit and scope of the present invention and, therefore, are anticipated.

Platform 104 comprises an electric power storage system 204 (hidden from view in the figures). Although the electric power storage system 204 is positioned or implemented inside platform 104 in the embodiment of FIG. 1, it is anticipated that in alternate embodiments the electric power storage system 204 may be positioned elsewhere in the mobile apparatus 100 as long as the electric power storage system 204 and the mobile apparatus 100 are operable to perform in accordance with the present invention's teachings.

In one embodiment, the electric power storage system 204 in mobile apparatus 100 is a Lithium-Ion (Li-ion) battery. Lithium-Ion batteries are known in the art for use as rechargeable electric batteries. They are usable for providing electric power, such as for vehicles, and are rechargeable to refresh the electrical charge that was drained during use. Their technology is well known in the art.

In another alternate embodiment, the electric power storage system 204 is a lithium iron phosphate battery. Lithium iron phosphate batteries are also rechargeable electrical batteries, and are known in the art.

In an alternate embodiment, the electric power storage system 204 in mobile apparatus 100 is a kinetic energy battery. Kinetic energy batteries, such as flywheel energy storage systems, use electric energy for input and store the energy in the form of kinetic energy. The kinetic energy is stored as the rotational motion of a spinning mass, such as a rotor. The rotor spins in a nearly frictionless enclosure to maximize its efficiency. The kinetic energy thus stored may be converted back to electrical energy as needed.

In alternate embodiments, it is anticipated that the electric power storage system 204 comprises a Nickel-Cadmium (NiCd) battery, a Nickel-metal hydride battery (NiMH), or a lead-acid battery.

It is anticipated that some embodiments of the present invention may comprise an electric power storage system 204 that comprises a combination of more than one type of rechargeable battery. For example, in one embodiment, the electric power storage system 204 in mobile apparatus 100 comprises a Lithium-Ion battery as well as a kinetic energy battery, both of which are operable to store and provide electrical power for the mobile apparatus 100, and both are rechargeable. Accordingly, any combination of the type of batteries comprising the electric power storage system 204 in an embodiment of the present invention will be consistent with the spirit and scope of the present invention.

In the embodiment shown in FIG. 1, a box 108 is implemented adjacent to platform 104. However, in alternate embodiments, it is anticipated that box 108 may be implemented elsewhere in mobile apparatus 100, provided that the box 108 and the mobile apparatus 100, including their respective components, are operable in accordance with the teachings of the present invention.

Figure 2:
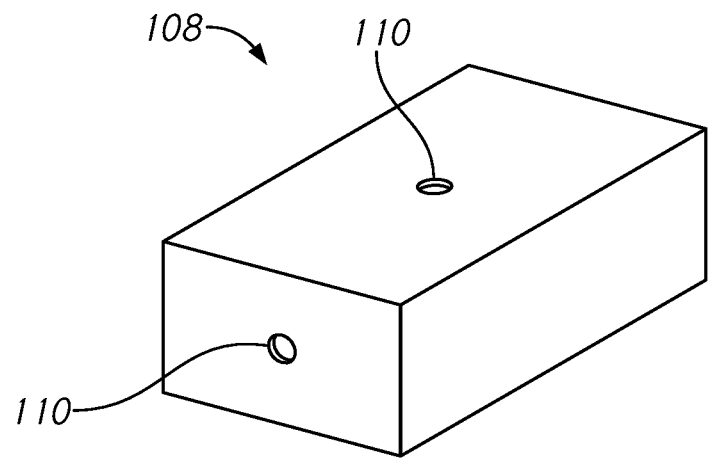
FIG. 2 shows the exterior of one embodiment of a box with a photovoltaic device implemented therein.
Figure 3:
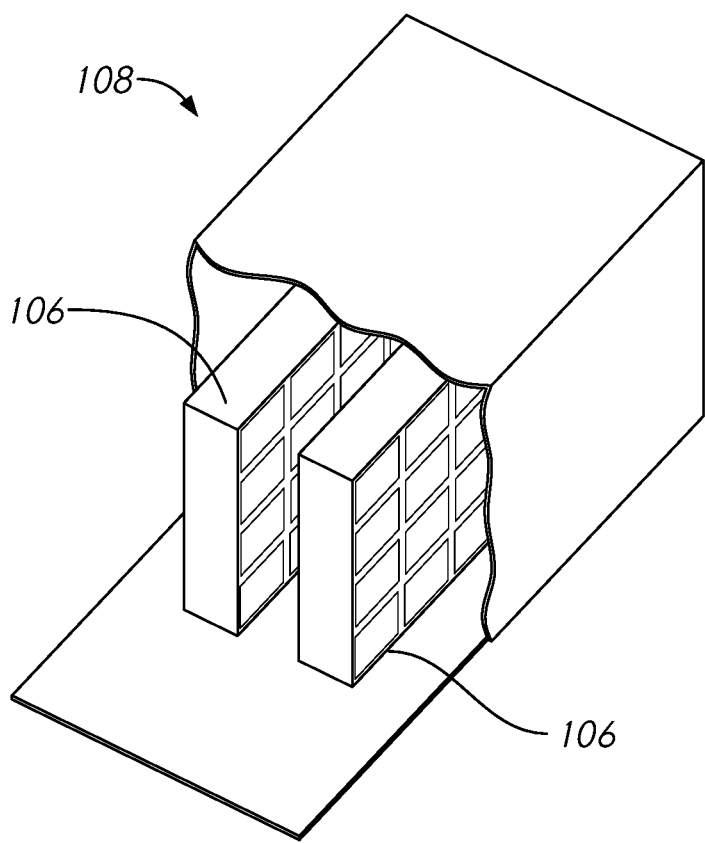
FIG. 3 shows a partial cutaway view of the box of FIG. 2 with a photovoltaic device implemented therein.

Mobile apparatus 100 comprises at least one photovoltaic device 106. The one or more photovoltaic devices 106 are preferably positioned inside box 108. As shown in FIG. 2, box 108 is substantially enclosed. FIG. 2 shows the exterior of one embodiment of box 108 with one or more photovoltaic devices 106 implemented inside it (hidden from view). FIG. 3 shows a partial cutaway view of the box 108 of FIG. 2 with one or more photovoltaic devices 106 implemented inside it.

Box 108 is shown in FIGS. 1 and 2 in a rectangular configuration. However, in alternate embodiments, box 108 may have any shape, such as round, oval, square, etc., provided that its construction and configuration is consistent with practicing the teachings of the present invention.

Each photovoltaic deice 106 is operable to convert light into electrical energy. The actual construction and operation of each photovoltaic device 106 may comprise any technology known in the art, or which may hereafter be invented, that is operable to convert light energy into electrical energy. For that purpose, it is anticipated that the one or more photovoltaic devices 106 will be associated with one or more photovoltaic collectors 226. In one embodiment, the photovoltaic devices 106 comprise a plurality of solar cells. Solar cells are known in the art, operable to convert light energy to electrical energy.

The cutaway view of FIG. 3 shows two photovoltaic devices 106 implemented inside box 108. This particular embodiment of mobile apparatus 100 comprises two photovoltaic devices 106, although it is anticipated that alternate embodiments may comprise any number of photovoltaic devices 106 implemented in box 108. The particular number of photovoltaic devices 106 in an embodiment will typically depend on the size, capacity, and performance of the respective photovoltaic devices 106. Those skilled in the art will recognize that the larger the performance requirements for a particular embodiment of mobile apparatus 100, or the lower the capacity of each photovoltaic device 106 for converting light energy to electrical energy, the more photovoltaic devices 106 will be needed in the respective embodiment.

For improved efficiency, the interior surface of the box 108 preferably has a reflective surface 122. With a reflective surface 122, which is preferably highly reflective, more light entering the box 108 will be delivered to the photovoltaic devices 106 inside the box 108, and thereupon be able to be converted to electrical energy. Any light entering the interior of box 108 that does not directly hit a photovoltaic device 106 will be reflected back by the interior reflective surface 122 of box 108, or keep getting reflected back by the interior reflective surface 122 of box 108, until it eventually hits a photovoltaic device 106 and gets converted to electrical energy. Those skilled in the art will appreciate that box 108 will ideally have a perfectly reflective interior surface 122, such as mirrors, to help convert as much light energy to electrical energy as possible in order to maximize the efficiency and performance of the respective mobile apparatus 100.

Box 108 has one or more openings 110. Openings 110 are designed to provide access for light to travel from the exterior of box 108 to the interior of box 108. In this regard, it is anticipated that each opening 110 is designed and constructed in a manner that will allow light to enter from the exterior of box 108 to the interior of box 108 via opening 110. Accordingly, opening 110 may simply be an opening cut out in the box 108, or it may have a two-way lens implemented in the opening 110, or it may have a one-way mirror implemented in the opening 110 whereby light flows substantially unidirectionally from the exterior of the box 110 to the interior of the box 110. In another embodiment, opening 110 may have a convex lens disposed therein whereby light entering the interior of the box 108 will be dispersed in the interior of the box 110.

Box 108 shown in FIGS. 2 and 3 shows three openings 110. However, in alternate embodiments, box 108 may have any number of openings 110. In one embodiment, box 108 has only one opening 110. In another embodiment, box 108 has four openings 110. All such embodiments are consistent with the spirit and scope of the present invention and are, therefore, anticipated.

Figure 4:
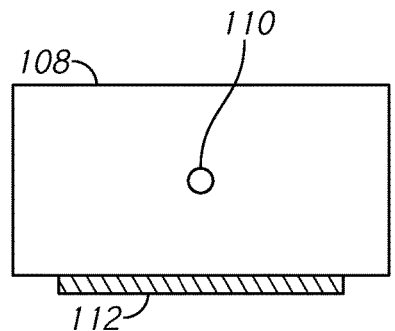
FIG. 4 shows one embodiment of a heat sink associated with the box of FIG. 2.

In one embodiment, a heat sink 112 is implemented substantially adjacent to box 108. FIG. 4 shows one embodiment of heat sink 112 implemented substantially adjacent to box 108. Heat sink 112 in the embodiment shown in FIG. 4 is associated with one or more photovoltaic devices 106 in box 108.

Heat sinks are generally known in the art. They serve to help dissipate undesired heat that may be generated during the operation of an electronic device. They are often used in conjunction with circuit boards that comprise a semiconductor chip, such as a microprocessor, as they usually generate heat during their routine operation. The semiconductor device may be, for example, a semiconductor computer chip, a solar cell, or the like. The heat sink absorbs heat generated by the semiconductor device and dissipates it to the ambient surrounding air. This helps in the performance and useful life of the semiconductor device.

Heat sinks are constructed in different shapes, configurations, sizes, etc., which usually depends on the performance requirements of the respective implementation. They are usually constructed of a metallic material that is capable of conducting heat. Heat sink 112 in the embodiment shown in FIG. 4 is designed and implemented as a relatively flat plate made of a metallic material. However, it is anticipated that heat sink 112 will have a shape, configuration, size, etc., that will vary by embodiment, provided that it serves to perform as a heat sink for dissipating heat that may be generated by the photovoltaic devices 106.

One embodiment of mobile apparatus 100 comprises a rectenna 114. Rectenna 114 may be implemented in mobile apparatus 100 at a location and in a position that is designed to complement the functions served by rectenna 114 for the purposes of this invention. In the embodiment shown in FIG. 1, rectenna 114 extends vertically upwards from the mobile apparatus 100. Those skilled in the art will appreciate that such vertically-extending implementation will help the efficiency of rectenna's 114 reach and performance for serving the purposes of the present invention.

Rectennas are known in the art. They serve the function of a receiving antenna that is capable of wirelessly receiving electromagnetic energy. The received electromagnetic energy may then be converted into a different form of energy for use, such as DC voltage for example. Rectenna 114 serves to receive wireless power transmitted from a power source and to deliver that energy in the form of electric power to the electric power storage system 204 in mobile apparatus 100. Those skilled in the art will appreciate that electric power delivered to the electric power storage system 204, which will typically be rechargeable, will serve to recharge the electric power storage system 204. In this regard, rectenna 114 is in electrical communication with the electric power storage system 204 in mobile apparatus 100.

It is anticipated that rectenna 114, including its components and its construction, will vary by embodiment. In the embodiment shown in FIG. 1, rectenna 114 comprises a receiver 116 that is designed to wirelessly receive electromagnetic energy that is transmitted in the form of radio waves. Further, rectenna 114 shown in FIG. 1 comprises a rectifier that is designed to convert the received electromagnetic energy to a DC voltage.

Figure 7:
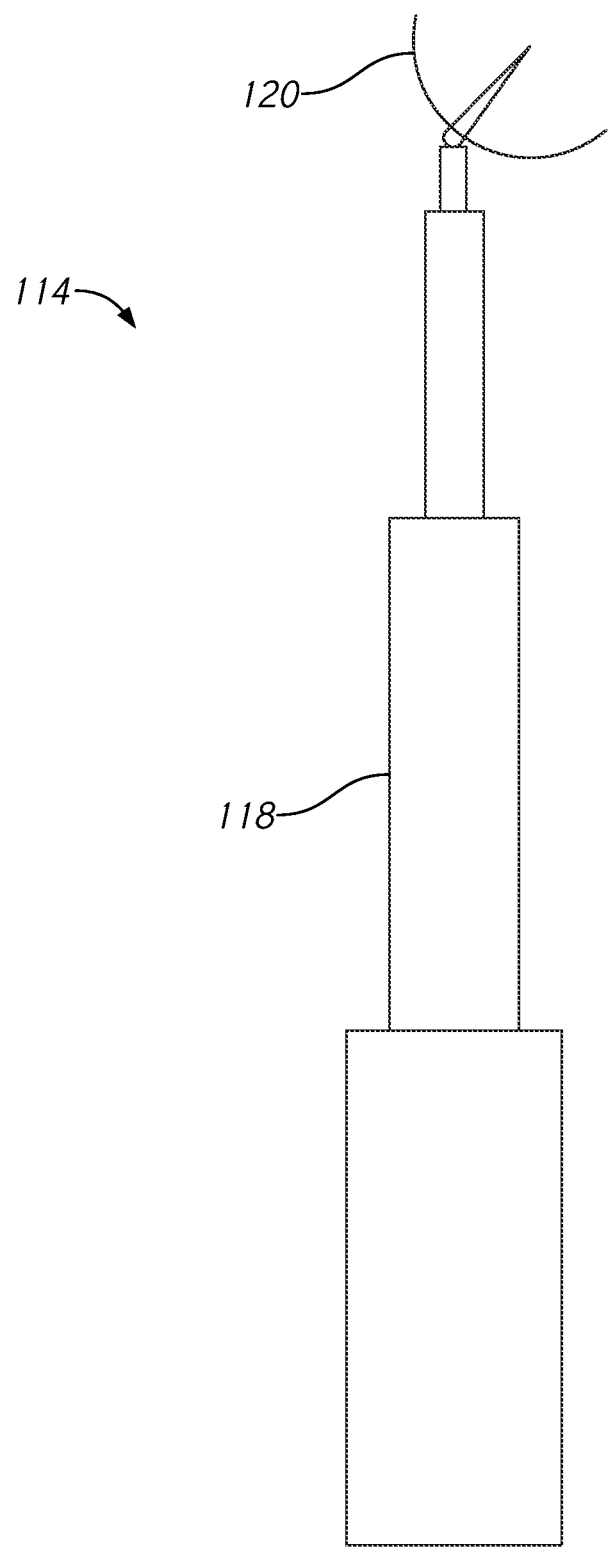
FIG. 7 shows one embodiment of a rectenna in the mobile apparatus of FIG. 1.

Rectenna 114 in the embodiment shown in FIG. 1 has a telescoping pole 118. One embodiment of rectenna 114 is shown separately in FIG. 7. The telescoping pole 118 allows rectenna 114 to be extended, or raised, for use, and retracted for storage during non-use. Such extension and retraction feature for pole 118 may be implemented electrically in some embodiments, while it may be implemented manually in other embodiments. Both such implementations for telescoping poles are known in the art.

Rectenna 114 comprises an electromagnetic wave receiver 120. It is anticipated that electromagnetic wave receiver 120 may comprise any apparatus known in the art that serves to receive electromagnetic waves. In one embodiment, electromagnetic wave receiver 120 is a parabolic antenna or a satellite dish. Those are both known in the art.

In one embodiment, rectenna 114 comprises a controller that is operable to control the direction in which the receiver 116 is facing at a given time. It is desirable for the receiver 116 to face the direction of the transmitter that is transmitting the electromagnetic energy being received by the receiver 116. Those skilled in the art will recognize that such positioning helps maximize the amount of electromagnetic energy that is transmitted by the transmitting source that is received and collected by the receiver 116. For this purpose, the pole 118 in such embodiment is rotatable. The pole 118 is preferably rotatable 360° whereby the pole 118 can be rotated to face the receiver 116 in any direction. Generally, the rotation of the pole 118 to orient the receiver 116 in a desired direction is implemented via software associated with the rectenna 114 and the controller. Such software and controllers are generally known in the art.

In another embodiment, the receiver 116 in rectenna 114 is operable to pivot up or down with respect to the pole 118. This pivot may be controllable by the controller or manually. Such pivotability further helps maximize the amount of electromagnetic energy that is transmitted by the transmitting source that is received and collected by the receiver 116. The receiver 116 is preferably pivotable 90° with respect to the pole 118 whereby the receiver 116 can be pivoted to face any angle vertically with respect to the horizon. Generally, it is anticipated that the pivoting of the receiver 116 to orient the receiver 116 at a desired angle with respect to the horizon is implemented via software associated with the rectenna 114 and the controller.

Alternate embodiments of the present invention may comprise two or more rectennas 114 in order to receive electromagnetic energy simultaneously from different sources. Other embodiments of the present invention may have no rectenna 114 in the mobile apparatus 100. All such embodiments are consistent with the overall spirit and scope of the present invention, and are therefore anticipated and are intended to be covered by the present claims.

Figure 11:
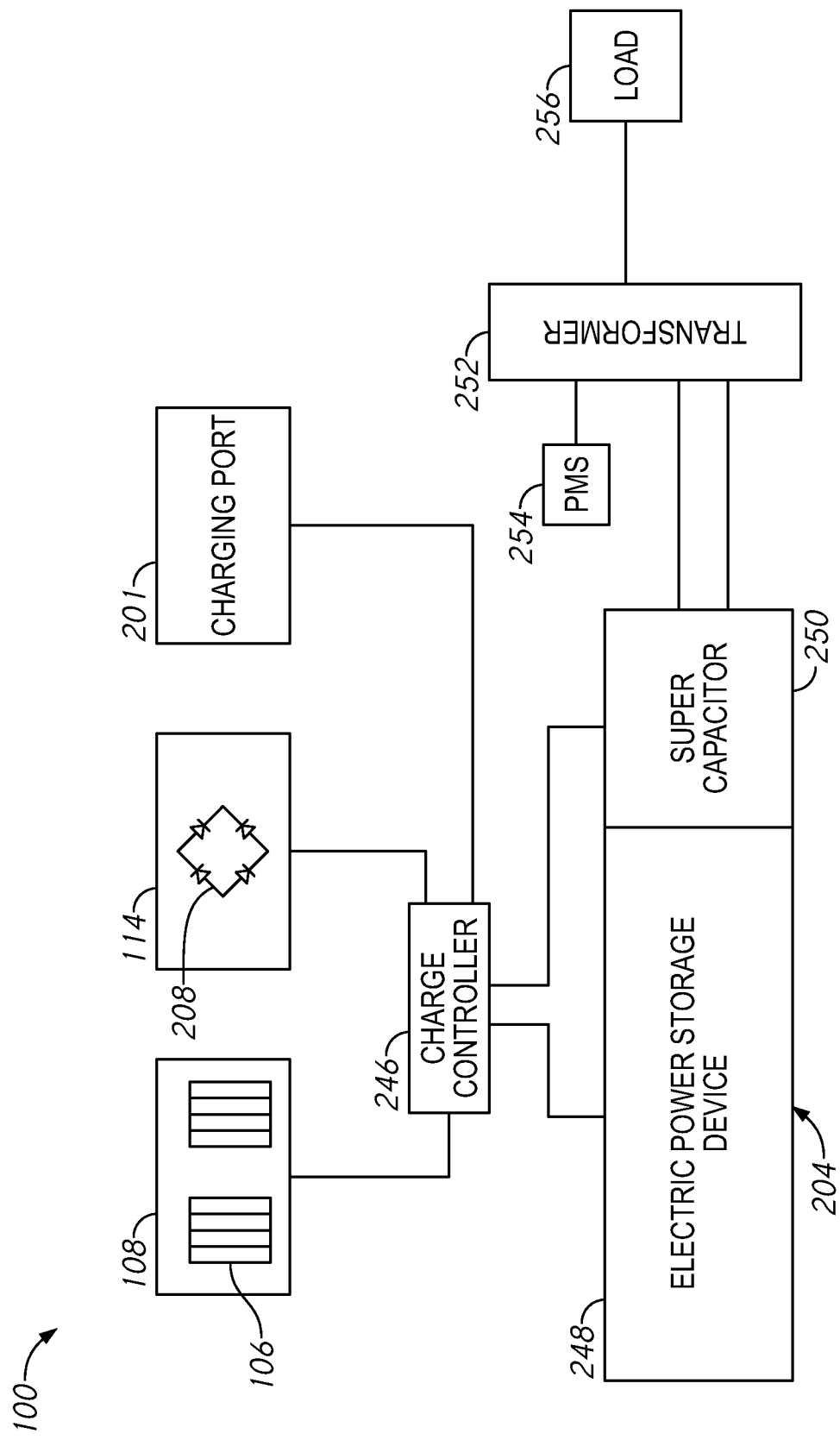
FIG. 11 shows a block diagram of some components of the mobile apparatus of FIG. 1.

One embodiment of the present invention comprises one or more charging ports 201. Each charging port 201 is designed to accommodate a plug apparatus that may be utilized for electrically connecting the charging port 201 to a source that provides electrical energy. Charging port 201 is in electrical communication with electric power storage system 204. The electric power storage system 204 may comprise, for example, an electric power storage device 248 and a super capacitor 250 as shown in FIG. 11. Those skilled in the art will recognize that physically connecting a plug apparatus to charging port 201 will result in the delivery of electric power from the source providing electrical energy to electric power storage system 204, which will help charge the electric power storage system 204.

It is anticipated that mobile apparatus 100 may comprise any number of charging ports 201. Some embodiments may have no charging ports 201, whereas other embodiments may have only one charging port 201, while other embodiments may have a plurality of charging ports 201. Those skilled in the art will recognize that various charging ports 201 may allow mobile apparatus 100 to accept different types of plug apparatuses in order to charge electric power storage system 204. Multiple charging ports 201 in some embodiments may even allow different electricity supply sources to simultaneously charge electric power storage system 204. Accordingly, all such embodiments are anticipated and are intended to be covered by the present claims.

Figure 5:
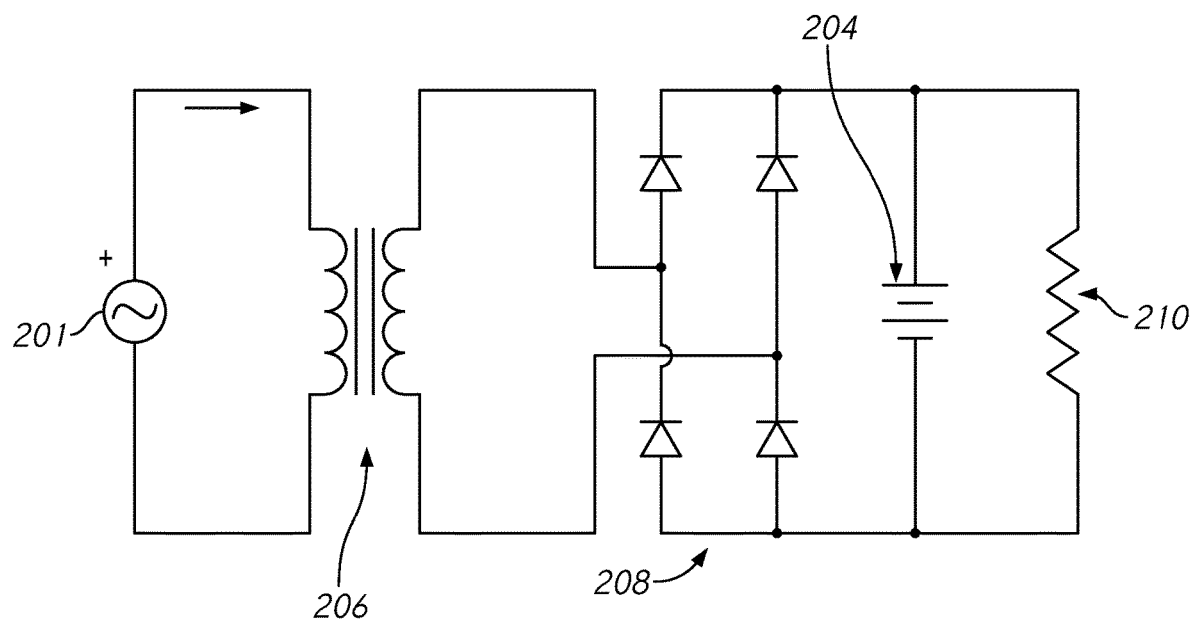
FIG. 5 shows a schematic diagram of one embodiment of an electric circuit comprising a charging port in electric communication with an electric power storage system in the mobile apparatus of FIG. 1.

FIG. 5 shows a schematic diagram of one embodiment of an electric circuit comprising a charging port 201 in electric communication with electric power storage system 204. This embodiment comprises a transformer 206 electrically connected to a charging port 201. In this embodiment, charging port 201 supplies AC electric power.

Transformer 206 may be utilized to convert the electrical power being supplied via charging port 201 to a desired voltage. In one embodiment, transformer 206 is a step-down transformer that converts the incoming voltage from charging port 201 to a desired lower voltage appropriate for electric power storage system 204.

In the embodiment shown in FIG. 5, the electric circuit comprises a bridge rectifier 208. Bridge rectifiers are known in the art for converting AC power to DC power. Bridge rectifier 208 serves to convert the incoming AC voltage from transformer 206, or directly from charging port 201, and convert it to a DC voltage, which is then delivered to electric power storage system 204.

It is anticipated that each charging port 201 may be physically implemented anywhere in the mobile apparatus 100, and that each charging port's 201 physical position in mobile apparatus 100 will typically vary by embodiment. In the embodiment of mobile apparatus 100 shown in FIG. 1, charging port 201 is implemented on one side of the mobile apparatus 100.

Figure 6:
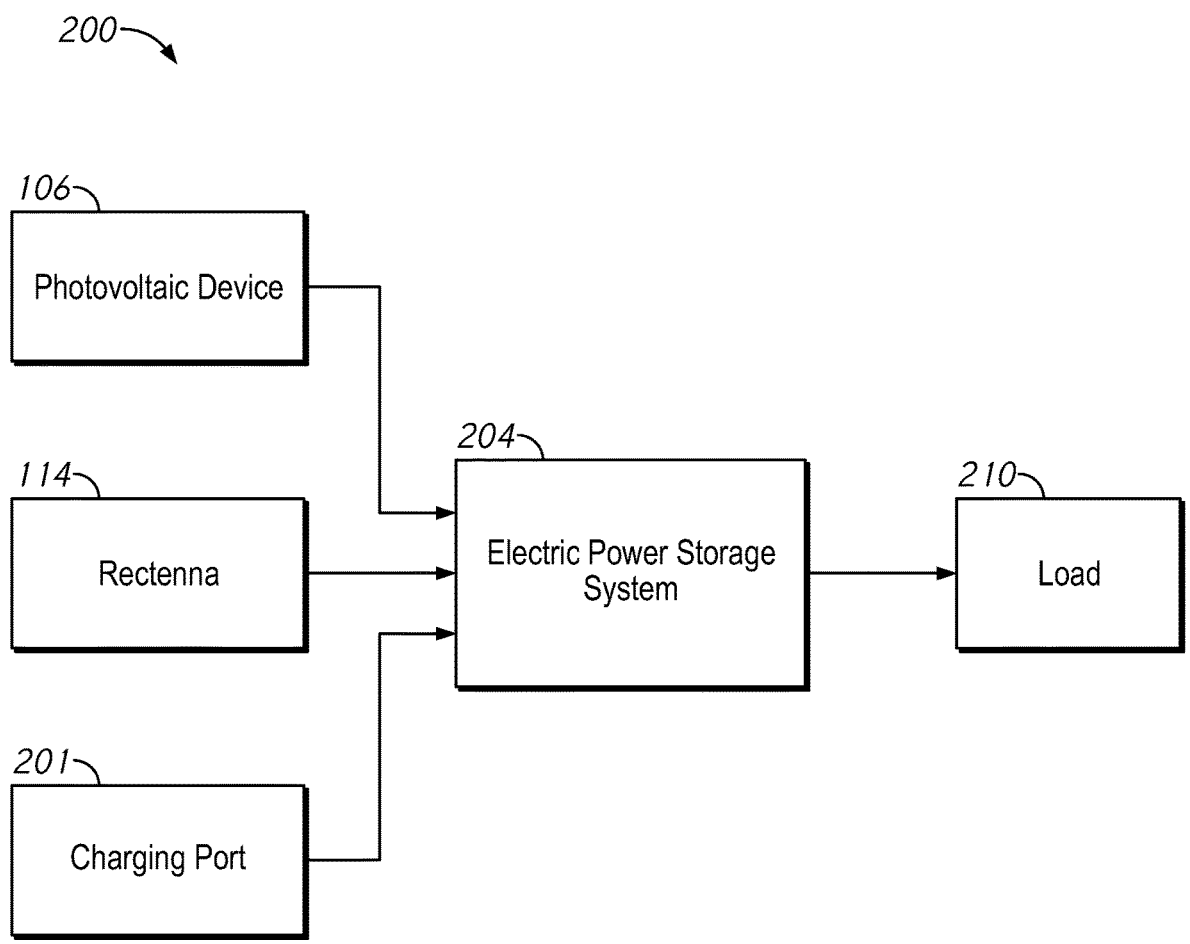
FIG. 6 is a flow diagram that shows a photovoltaic device, a rectenna, and a charging port in electrical connection with an electric power storage system in the mobile apparatus of FIG. 1.

FIG. 6 shows a flow diagram 200 with photovoltaic device 106, rectenna 114, and charging port 201 in electrical connection with electric power storage system 204. Each of the three devices is connected to electric power storage system 204 to deliver electric power to the electric power storage system 204. Electric power storage system 204 is in electrical communication with a load 210 and is operable to supply electrical power to the load 210. Electric power storage system 204 may receive electric power from any one or more of the three electric power sources, whether individually or simultaneously from two or more of the electric power sources, which electric power will serve to charge electric power storage system 204, which in turn may provide electric power to the load 210.

Figure 8:
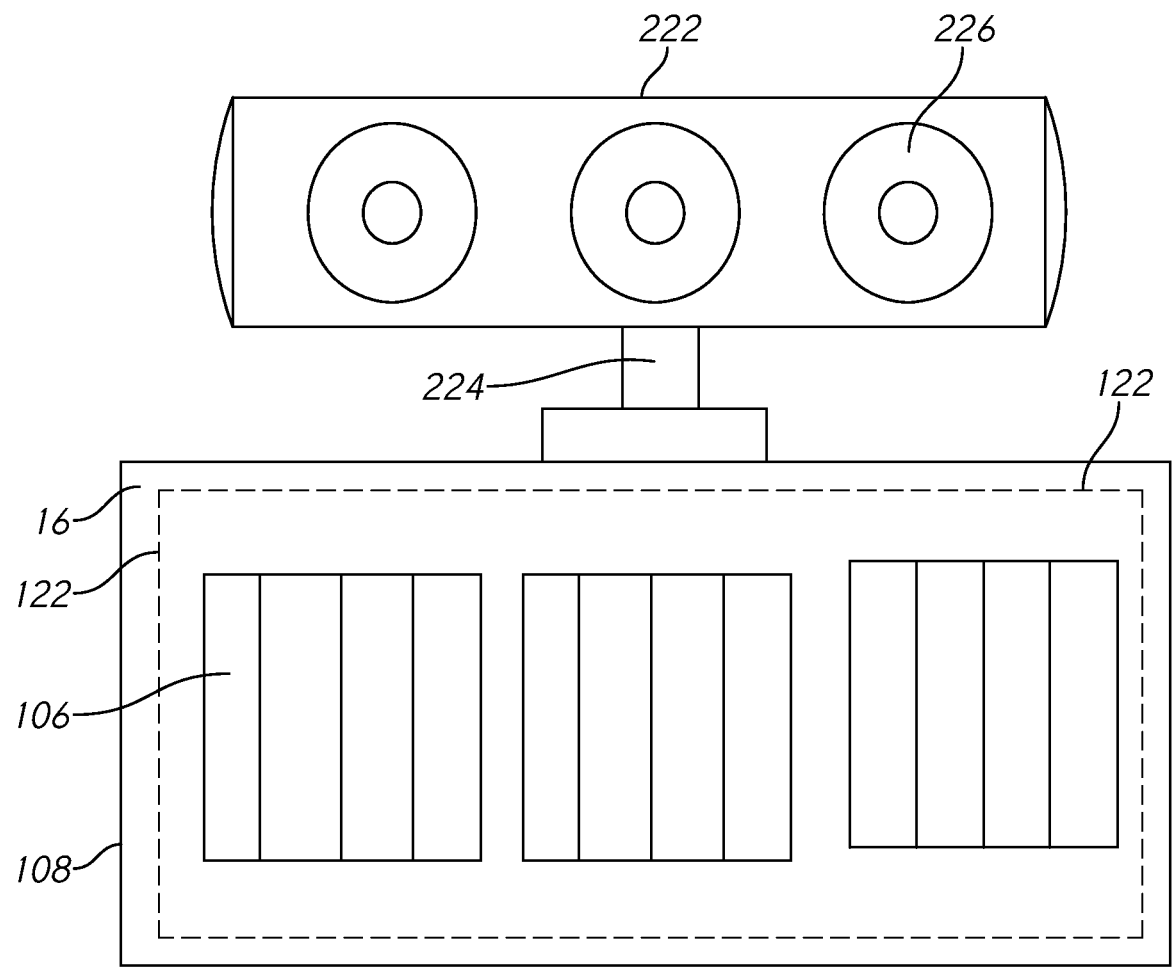
FIG. 8 shows a lens apparatus operatively connected to a box in the mobile apparatus of FIG. 1.

FIG. 8 shows a lens apparatus 222 operatively connected to box 108 in mobile apparatus 100. FIG. 8 also shows a partial cutaway view of the interior of box 108, which includes a plurality of photovoltaic devices 106. Further, lens apparatus 222 comprises one or more photovoltaic collectors 226.

Lens apparatus 222 is operatively connected to box 108 via a stem 224. Lens apparatus 222 is preferably rotatable with respect to box 108. In one embodiment, stem 224 facilitates lens apparatus's 222 rotation with respect to box 108. The rotation of lens apparatus 222 occurs electrically, usually with an electric motor, but it is anticipated that lens apparatus 222 may be rotatable manually in alternate embodiments.

In one embodiment, lens apparatus 222 rotates automatically to orient the lenses 228 towards the sun. Those skilled in the art will recognize that continuously adjusting the orientation of the lens apparatus 222 during the course of the day to face the sun will help maximize the efficiency of lens apparatus's 222 collection of solar light. Software-based sun tracking products are known in the art, which help orient a solar panel, such as a lens or an array, towards the sun to follow the position of the sun as it changes during the course of the day.

Photovoltaic collectors 226 are designed to collect solar energy. For that purpose, it is anticipated that photovoltaic collectors 226 may be designed and constructed in any manner known in the art, or which may hereafter be invented, that serve the purpose of collecting solar energy.

Figure 9:
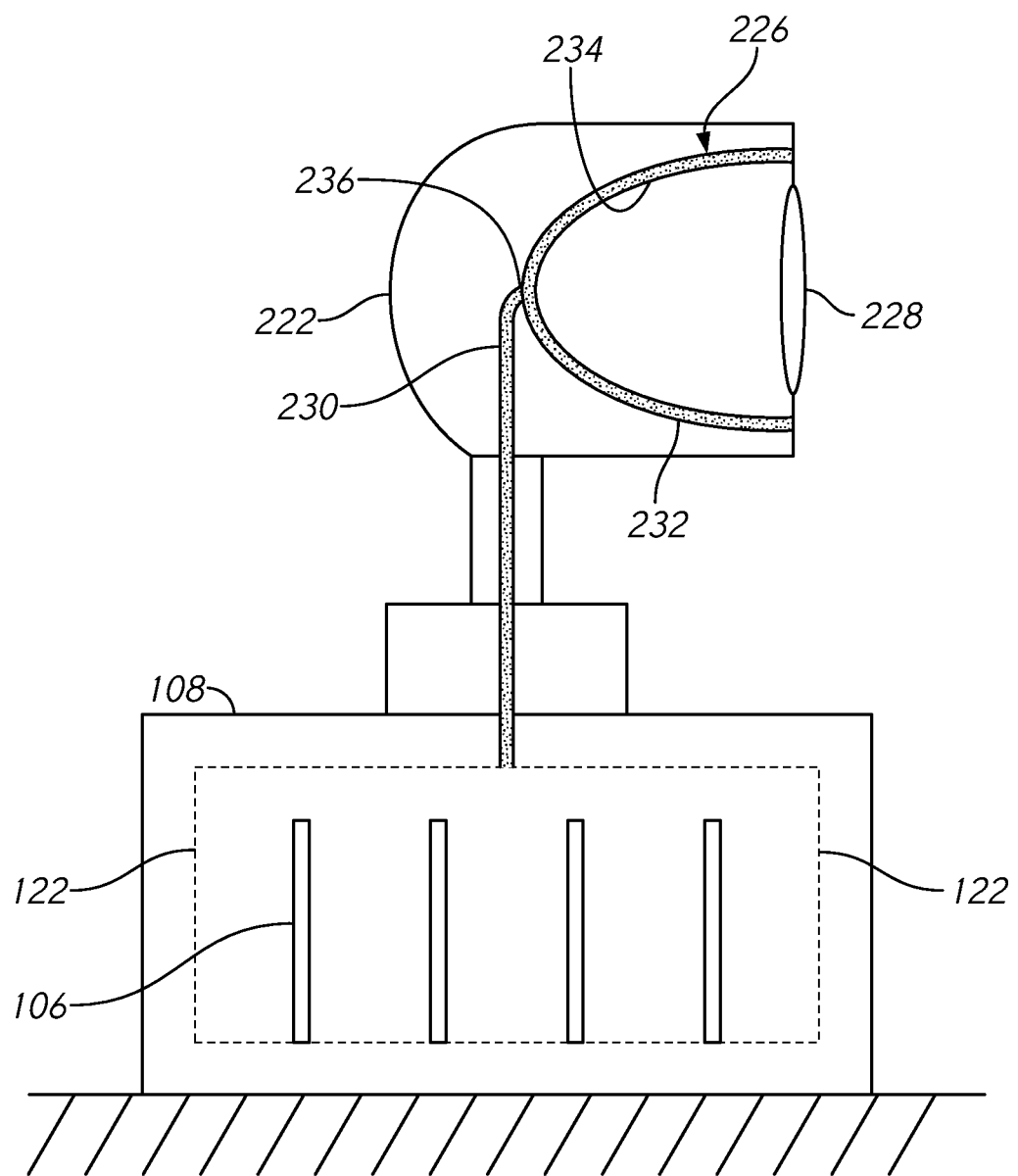
FIG. 9 is a partial cutaway side view of the lens apparatus operatively connected to box in the mobile apparatus of FIG. 1.

FIG. 9 shows a partial cutaway side view of the lens apparatus 222 operatively connected to box 108. In one embodiment, photovoltaic collectors 226 have a lens 228. In one embodiment, the lens 228 is a convex lens. In an alternate embodiment, lens 228 is a Fresnel lens. Fresnel lenses are known in the art and may serve to increase the amount of light that is captured behind the Fresnel lens.

In the embodiment shown in FIG. 9, photovoltaic collector 226 has a conical shape. The conical shape is configured to help light energy that is captured by lens apparatus 222, through lens 228, to be focused on a light energy communication apparatus 230 that is associated with the photovoltaic collector 226. Light energy communication apparatus 230 then serves to communicate that light energy captured by the lens apparatus 222 to the box 108. As shown, light energy communication apparatus 230 is connected to lens apparatus 222 at a focal point located at a rear point 236 of the lens apparatus 222. In this configuration, those skilled in the art will appreciate that light energy being received by photovoltaic collector 226 will be directed at rear point 236 of the photovoltaic collector 226. This light energy is then communicated to the box 108 via the light energy communication apparatus 230.

To improve the efficiency of the collection of light energy by photovoltaic collector 226, it is anticipated that the interior surface 234 of photovoltaic collector 226 will be constructed of, or coated with, a reflective material. The reflective material will allow more light to be reflected and directed at rear point 236. Further, as discussed above, the shape of the interior 234 of photovoltaic collector 226 is preferably designed to reflect and direct light at rear point 236.

In one embodiment, photovoltaic collectors 226 are in light communication with the one or more photovoltaic devices 106 via light energy communication apparatus 230. Such light communication may occur in any manner or via any apparatus known in the art for light communication, such as through a fiberoptic cable. In the embodiment shown, light energy communication apparatus 230 is a fiberoptic cable. Fiberoptic cables are known in the art for communicating light energy from one point to another. However, it is anticipated that apparatus 230 may be any apparatus known in the art for such purpose, or which may hereafter be invented, for communicating light energy.

As shown, light energy communication apparatus 230 is connected to the photovoltaic collector 226 at one end, and to the box 108 at its other end. Light energy communication apparatus 230 preferably extends into the interior of the box 108 as shown in FIG. 9. In this configuration, the light energy collected by photovoltaic collectors 226 will be communicated by the light energy communication apparatus 230 to the interior of box 108, which comprises one or more photovoltaic devices 106. Those skilled in the art will appreciate that this apparatus will help convert light energy received by photovoltaic collectors 226 to electrical energy by the one or more photovoltaic devices 106.

Figure 10:
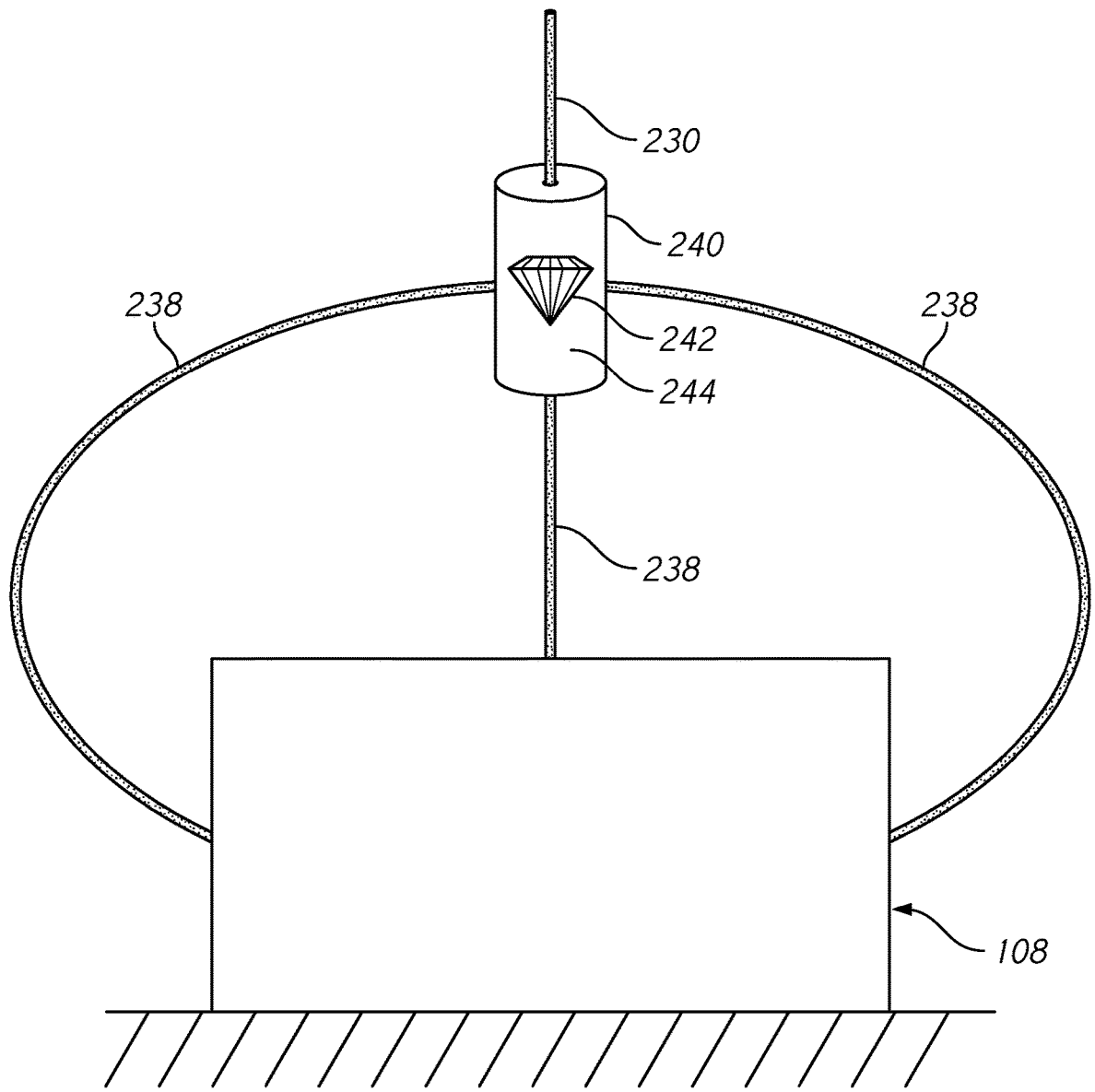
FIG. 10 shows a partial cutaway view of an alternate embodiment of a light energy communication apparatus operatively connected to a box in the mobile apparatus of FIG. 1.

FIG. 10 shows a partial cutaway view of an alternate embodiment of light energy communication apparatus 230. The light energy communication apparatus 230 is connected to an enclosure member 240, wherein the light energy communicated via light energy communication apparatus 230 is delivered to the enclosure member 240.

Enclosure member 240 has a hollow cavity 244. Disposed in the hollow cavity 244 is a prism 242. Prism 242 may be any prism known in the art, which typically refracts light that enters it. In the embodiment shown, prism 242 has a diamond shape. However, it is anticipated that prism 242 may have any shape of a prism that serves to refract and disperse the light that enters it. All such embodiments would be consistent with the spirit and scope of the present invention, and are anticipated.

Those skilled in the art will appreciate that prism 242 will refract light that enters into the cavity 244 via light energy communication apparatus 230, and disperse the light in the cavity 244. Those skilled in the art will recognize that such dispersion of light will generally be fairly random, with light being dispersed upon a majority of the various surfaces that form the cavity 244.

As shown in FIG. 10, a plurality of secondary light energy communication apparatuses 238 are connected to the cavity 244 at one end, whereby light energy from the cavity 244 may enter each of the secondary light energy communication apparatuses 238. Each of the secondary light energy communication apparatuses 238 are connected to the interior of box 108 at their other end, wherein light energy from the cavity 244 is communicated to the one or more photovoltaic devices 106 in the box 108. The light energy may then be converted into electrical energy by the one or more photovoltaic devices 106.

The secondary light energy communication apparatuses 238 may be any apparatus known in the art, or which may hereafter be invented, that serves to communicate light energy. In one embodiment, secondary light energy communication apparatuses 238 are fiberoptic cables.

As shown in FIG. 10, the secondary light energy communication apparatuses 238 are preferably connected to both, the enclosure member 240 and the box 108, at different locations on each. One embodiment comprises four secondary light energy communication apparatuses 238, with one end of each connected to the enclosure member 240 spaced equally apart on the peripheral surface of the enclosure member 240. In this embodiment, the enclosure member 240 is cylindrical in shape. Further, the other end of each secondary light energy communication apparatus 238 is connected to a different side of box 108. Those skilled in the art will recognize that this configuration helps maximize the amount of light energy that is communicated to the photovoltaic devices 106, from various angles and directions, which in turn helps maximize the amount of electrical energy that is produced by the photovoltaic devices 106.

The shape and configuration of the enclosure member 240 is cylindrical as shown in FIG. 10. However, in alternate embodiments, the enclosure member 240 may have a different shape, such as a square box, a rectangular box, a pyramid shaped box, or the like, while remaining consistent with the spirit and scope of the present invention. All such variations and embodiments are, therefore, anticipated and are intended to be covered by the present claims.

FIG. 11 shows a block diagram of some components of mobile apparatus 100 in accordance with one embodiment of the present invention. Box 108, with photovoltaic devices 106 inside it, is connected to a charge controller 246. Rectenna 114 and charging port 201 are also connected to the charge controller 246. Photovoltaic devices 106 and rectenna 114 serve to generate electrical energy, while charging port 201 delivers electrical energy, which are all delivered to the charge controller 246. Charge controller 246 serves to protect the electric power storage device 248, such as by preventing overcharging, regulating the electrical voltage or the electrical current being delivered to the electric power storage device 248, overheating, and the like. Charge controllers for performing such functions, operably implemented between an energy source, such as solar panels, and a power storage system, such as a battery, are known in the art and are available commercially. It is anticipated that the particular charge controller 246 implemented in mobile apparatus 100 will vary by embodiment, and will typically comprise an operational combination of electronic hardware and software designed to perform the charge controller's 246 desired functions.

Charge controller 246 is operationally connected to electric power storage device 248, which may be a lithium-ion battery in one embodiment. The implementation and features of the electric power storage device 248 are discussed in more detail above.

A super capacitor 250 is operationally connected to electric power storage device 248 and the charge controller 246. A super capacitor may be used in conjunction with a battery, and is typically designed to draw power out of the battery and to control the amount of power that is delivered from the battery to a load. Super capacitors help lessen electrical surges or dips when a load is applied to the battery. They can also help control the amount of power that is delivered to the load. They also help allow the battery to recharge. Super capacitors for performing such functions are known in the art and are available commercially.

In the embodiment shown in FIG. 11, the electric power storage device 248 and the super capacitor 250 are connected to a transformer 252. Transformers are known in the art for serving the purposes of stepping up or stepping down an incoming voltage and outputting a new voltage. In one embodiment, transformer 252 steps down the incoming voltage to 12V to match the battery-voltage of an ordinary vehicle battery. In an alternate embodiment, transformer 252 steps up the incoming voltage to 240V to match the charging voltage required for some electric vehicles, such as electric vehicles sold commercially under the mark TESLA. However, it is anticipated that the voltage output by transformer 252, whether stepped down or stepped up, will vary by embodiment.

In one embodiment, the output voltage of transformer 252 is adjustable whereby mobile apparatus 100 may be utilized to serve the power requirements for different types of batteries or electric vehicles. In this embodiment, the desired output voltage would be selectable by a user, such as electronically or with a multi-position switch, to achieve the desired output voltage. Transformers with a plurality of selectable output voltages are known in the art.

Transformer 252 is connected to a power management system ("PMS") 254. PMS 254 is designed to help manage the electrical power that is stored, or is handled by, electric power storage device 248 and super capacitor 250. In one embodiment, for example, PMS 254 prevents the power storage device 248 and the super capacitor 250 from outputting electrical energy, such as to a load 256, when the electrical charge level of the power storage device 248 drops below 30%. Power management systems for performing such functions, operationally implemented with power storage systems, such as a battery, are known in the art and are available commercially. It is anticipated that the particular power management system 254 implemented in a mobile apparatus 100 will vary by embodiment, and will typically comprise an operational combination of electronic hardware and software designed to perform the functions desired for the respective power management system 254.

In the embodiment shown in FIG. 11, the output of transformer 252 is in electric communication with a load 256. Such electrical communication between transformer 252 and load 256 will typically occur when the load 256 is selectively connected to mobile charging apparatus 100. The load 256 may be any electrical device, such as an electric vehicle's battery for example, that is operable to receive electrical energy. To receive electrical energy from the electric power storage system 204, the load 256 may be electrically connected to the transformer 252 via an outlet 202 as shown in FIG. 1. Outlet 202 may comprise any apparatus for electrical connections known in the art, or which may hereafter be invented, such as a 3-pin electrical socket, a 2-pin electrical socket, a USB port, a USB-C port, or the like, to create an electrical connection. An example would be by utilizing a male plug to be inserted into a female socket.

In alternate embodiments, the load 256 may be electrically connected to the transformer 252 via a wireless charging mechanism 203. Wireless charging mechanisms for wirelessly communicating electrical energy from one device to another device are known in the art.

It is notable that the mobile apparatus 100 and its various components may be integrally constructed as one integral unit. Alternatively, the various components of mobile apparatus 100 may be separable and are removably attached to the mobile apparatus 100. All such variations and combinations are anticipated and are intended to be included in the present claims.

The present invention can take the form of an entirely hardware embodiment, or an embodiment containing both hardware and software elements. The hardware and software are anticipated to include, but are not limited to, firmware, resident software, microcode, and the like.

Although the devices, systems, apparatus and methods have been described and illustrated in connection with certain embodiments, variations and modifications will be evident to those skilled in the art. Such variations and modifications may be made without departing from the spirit and scope of the present disclosure, and are therefore anticipated. The description and teachings herein are thus not to be limited to the precise details of methodology or construction set forth herein because variations and modification are intended to be included within the spirit and scope of the present disclosures and its teachings.

I claim:

1. An electrical charging apparatus, comprising:
    a lens apparatus capable of receiving light energy;
    a primary light energy communication apparatus having a first end and a second end, the first end of said primary light energy communication apparatus in light communication with said lens apparatus;
    an enclosure member, with a cavity inside said disclosure member, said cavity in light communication with the second end of said primary light energy communication apparatus;
    a prism disposed in the cavity in said enclosure member;
    a secondary light energy communication apparatus having a first end and a second end, the first end of said secondary light energy communication apparatus in light communication with the cavity in said enclosure member;
    a box having an interior, the second end of said secondary light energy communication apparatus in light communication with the interior of said box; and
    a photovoltaic device positioned in the interior of said box, said photovoltaic device capable of receiving light energy and converting it to electrical energy, wherein:
        light energy from said lens apparatus is communicated through said primary light energy communication apparatus, through the cavity in said enclosure member, through said prism, and through said secondary light energy communication apparatus, to said photovoltaic device, and
    said prism refracts the light energy in the cavity in said enclosure member.

2. The electrical charging apparatus of claim 1, wherein the interior of said box has a reflective surface or a reflective coating.

3. The electrical charging apparatus of claim 1, further comprising a plurality of photovoltaic devices positioned in the interior of said box, said plurality of photovoltaic devices capable of receiving light energy and converting it to electrical energy.

4. The electrical charging apparatus of claim 1, wherein said primary light energy communication apparatus is a fiberoptic cable.

5. The electrical charging apparatus of claim 4, wherein said secondary light energy communication apparatus is a fiberoptic cable.

6. The electrical charging apparatus of claim 1, further comprising a power storage device in electrical communication with said photovoltaic device.

7. The electrical charging apparatus of claim 6, wherein said power storage device comprises at least one of:
    a lithium-ion battery, a lithium-iron phosphate battery, a kinetic energy battery, a nickel-cadmium battery, a nickel-metal hydride battery, or a lead-acid battery.

8. The electrical charging apparatus of claim 6, further comprising:
    a rectenna in electrical communication with said power storage device; and
    a charging port in electrical communication with said power storage device.

9. The electrical charging apparatus of claim 1, wherein said lens apparatus comprises a photovoltaic collector for receiving light energy.

10. The electrical charging apparatus of claim 9, wherein said photovoltaic collector comprises:
    a conical shape with an opening at a first end and a focal point at a second end, and
    a lens implemented at the first end of said conical shape, wherein
        the first end of said primary light energy communication apparatus is in light communication with said focal point at the second end of said conical shape.

11. The electrical charging apparatus of claim 10, wherein said lens is a Fresnel lens.

12. The electrical charging apparatus of claim 11, wherein:
    the conical shape of said photovoltaic collector has an interior; and
    the interior of said conical shape of the photovoltaic collector is reflective or is coated with a reflective material.

13. The electrical charging apparatus of claim 9, wherein said lens apparatus comprises a plurality of photovoltaic collectors for receiving light energy.

14. The electrical charging apparatus of claim 1, further comprising a heat sink associated with said photovoltaic device, said heat sink able to dissipate heat from said photovoltaic device.

15. The electrical charging apparatus of claim 1, further comprising a plurality of secondary light energy communication apparatuses, each of said plurality of secondary light energy communication apparatuses comprising a first end and a second end, wherein:
    the first end of each of said plurality of secondary light energy communication apparatuses is in light communication with the cavity in said enclosure member; and
    the second end of each of said plurality of secondary light energy communication apparatuses is in light communication with the interior of said box.

16. The electrical charging apparatus of claim 15, wherein said plurality of secondary light energy communication apparatuses are fiberoptic cables.

17. The electrical charging apparatus of claim 15, wherein the second end of each of said plurality of secondary light energy communication apparatuses is in light communication with the interior of said box at a different location in the interior of said box.

18. The electrical charging apparatus of claim 17, wherein the first end of each of said plurality of secondary light energy communication apparatuses is in light communication with the cavity in said enclosure member at a different location in said cavity.

19. The electrical charging apparatus of claim 18, wherein:
   said enclosure member is cylindrical in shape; and
   the first end of each of said plurality of secondary light energy communication apparatuses is spaced equally apart from each other in the cavity in said enclosure member.

20. The electrical charging apparatus of claim 18, wherein:
   the interior of said box has a plurality of sides; and
   each of the second ends of said plurality of secondary light energy communication apparatuses is in light communication with a different side of the interior of said box.

* * * * *